United States Patent
Kim et al.

(10) Patent No.: US 11,095,484 B2
(45) Date of Patent: Aug. 17, 2021

(54) DIFFERENTIAL SIGNAL PROCESSING DEVICE USING ADVANCED BRAID CLOCK SIGNALING

(71) Applicant: SAMSUNG ELECTRONICS CO., LTD., Suwon-si (KR)

(72) Inventors: Chulwoo Kim, Seoul (KR); Yeonho Lee, Bucheon-Si (KR); Jonghyuck Choi, Seoul (KR)

(73) Assignees: SAMSUNG ELECTRONICS CO., LTD., Suwon-si (KR); KOREA UNIVERSITY RESEARCH & BUSINESS FOUNDATION, Seoul (KR)

( * ) Notice: Subject to any disclaimer, the term of this patent is extended or adjusted under 35 U.S.C. 154(b) by 0 days.

(21) Appl. No.: 16/817,760

(22) Filed: Mar. 13, 2020

(65) Prior Publication Data
US 2020/0304345 A1    Sep. 24, 2020

(30) Foreign Application Priority Data
Mar. 20, 2019    (KR) .......................... 10-2019-0032003

(51) Int. Cl.
*H04L 25/02*    (2006.01)
*H04L 25/493*    (2006.01)
*H04L 25/08*    (2006.01)

(52) U.S. Cl.
CPC ...... *H04L 25/0272* (2013.01); *H04L 25/0292* (2013.01); *H04L 25/085* (2013.01); *H04L 25/493* (2013.01)

(58) Field of Classification Search
CPC . H04L 25/0272; H04L 25/493; H04L 25/085; H04L 25/0292; H04L 25/4906; H04L 25/03006
See application file for complete search history.

(56) References Cited

U.S. PATENT DOCUMENTS

| 6,445,744 B1 | 9/2002 | Dell et al. |
| 7,342,969 B2 | 3/2008 | Tate et al. |
| 8,013,763 B2 | 9/2011 | Chard et al. |

(Continued)

FOREIGN PATENT DOCUMENTS

| JP | 2013-009187 | 1/2013 |
| KR | 10-0699469 | 3/2007 |

(Continued)

OTHER PUBLICATIONS

Korean Office Action dated Mar. 4, 2020 in corresponding Korean Application No. KR 10-2019-0032003 (English Translation), 5 pages.

*Primary Examiner* — Jean B Corrielus
(74) *Attorney, Agent, or Firm* — F. Chau & Associates, LLC

(57) ABSTRACT

A differential signal processing device is described which includes an encoder configured to encode input data into one or more differential signals and a transmitter configured to sequentially transmit the one or more differential signals using a plurality of transmission lines. The encoder converts a plurality of bits, corresponding to a transmission time interval, among the input data into an encoding code array in the transmission time interval obtained by increasing an encoding unit time, encoded for each of the one or more differential signals, by an integer multiple.

16 Claims, 13 Drawing Sheets

(56) References Cited

U.S. PATENT DOCUMENTS

| | | |
|---|---|---|
| 8,395,702 B2 | 3/2013 | Sontag et al. |
| 8,520,725 B2 | 8/2013 | Jeong et al. |
| 10,122,561 B2 | 11/2018 | Holden et al. |
| 2012/0120043 A1 | 5/2012 | Cho et al. |
| 2015/0381346 A1* | 12/2015 | Holden .................... H04B 3/02 714/775 |
| 2016/0013887 A1 | 1/2016 | Shen et al. |
| 2018/0176909 A1 | 6/2018 | Wikstrom et al. |
| 2019/0028308 A1* | 1/2019 | Fox .................. H04L 25/03885 |
| 2020/0235856 A1* | 7/2020 | Savoj ...................... H04L 25/49 |
| 2020/0374158 A1* | 11/2020 | Tajalli ................ H04L 25/0292 |

FOREIGN PATENT DOCUMENTS

| | | |
|---|---|---|
| KR | 10-2015-0133254 | 11/2015 |
| KR | 10-2019-0003666 | 1/2019 |
| WO | 03/058376 | 7/2003 |

\* cited by examiner

FIG. 10

| M | log:6 | | M*log:6 | Integer N | Pin-efficiency | | # of redundant cases |
|---|---|---|---|---|---|---|---|
| 1 | 2.584963 | | 2.584963 | 2 | 1 | | 2 |
| 2 | 2.584963 | | 5.169925 | 5 | 1.25 | | 4 |
| 3 | 2.584963 | | 7.754888 | 7 | 1.166667 | | 88 |
| 4 | 2.584963 | | 10.33985 | 10 | 1.25 | | 272 |
| 5 | 2.584963 | | 12.92481 | 12 | 1.2 | | 3680 |
| 6 | 2.584963 | | 15.50978 | 15 | 1.25 | | 13888 |
| 7 | 2.584963 | | 18.09474 | 18 | 1.285714 | | 17792 |
| 8 | 2.584963 | | 20.6797 | 20 | 1.25 | | 631040 |
| 9 | 2.584963 | | 23.26466 | 23 | 1.277778 | | 1689088 |
| 10 | 2.584963 | | 25.84963 | 25 | 1.25 | | 26911744 |
| 11 | 2.584963 | | 28.43459 | 28 | 1.272727 | | 94361600 |
| 12 | 2.584963 | | 31.01955 | 31 | 1.291667 | | 29298688 |
| 13 | 2.584963 | | 33.60451 | 33 | 1.269231 | | 4.47E+09 |
| 14 | 2.584963 | | 36.18948 | 36 | 1.285714 | | 9.64E+09 |
| 15 | 2.584963 | | 38.77444 | 38 | 1.266667 | | 1.95E+11 |
| 16 | 2.584963 | | 41.3594 | 41 | 1.28125 | | 6.22E+11 |
| 17 | 2.584963 | | 43.94436 | 43 | 1.264706 | | 8.13E+12 |
| 18 | 2.584963 | | 46.52933 | 46 | 1.277778 | | 3.12E+13 |
| 19 | 2.584963 | | 49.11429 | 49 | 1.289474 | | 4.64E+13 |
| 20 | 2.584963 | | 51.69925 | 51 | 1.275 | | 1.4E+15 |
| 21 | 2.584963 | | 54.28421 | 54 | 1.285714 | | 3.92E+15 |
| 22 | 2.584963 | | 56.86918 | 56 | 1.272727 | | 5.96E+16 |
| 23 | 2.584963 | | 59.45414 | 59 | 1.282609 | | 2.13E+17 |
| 24 | 2.584963 | | 62.0391 | 62 | 1.291667 | | 1.27E+17 |

FIG. 12

DIFFERENTIAL SIGNAL PROCESSING DEVICE USING ADVANCED BRAID CLOCK SIGNALING

CROSS-REFERENCE TO RELATED APPLICATION(S)

This application claims benefit of priority to Korean Patent Application No. 10-2019-0032003 filed on Mar. 20, 2019 in the Korean Intellectual Property Office, the disclosure of which is incorporated by reference herein in its entirety.

BACKGROUND

The present disclosure relates to a differential signal processing device, and more particularly, to a differential signal processing device capable of reducing a data transmission rate using advanced braid clock signaling.

Electronic devices include a wide variety of equipment including televisions, monitors, and smartphones. These devices are continuously being developed and improved to meet consumer demand. As a result, electronic components are becoming more powerful. Among the many electronic components in electronic devices, signal processing devices may be configured to perform signal transmission and reception between different electronic components. An example of a signal processing device is the interface connecting a display panel to a timing controller. This interface uses clock signals to read data from a data transmitter received at a data receiver.

In some cases, signal processing devices may be configured to transmit clock signal by adding a dummy bit to the transmitted data. Transmitting a dummy bit can cause loss of a transmission bandwidth. Additionally, transmission of a clock signal using pulse amplitude modulation (PAM) technique may also reduce a noise margin. Therefore, there is a need in the art for signal processing devices capable of increasing a data transmission rates while transmitting state transition information corresponding to a clock signal.

SUMMARY

Example embodiments provide a differential signal processing device capable of converting more input data into a differential signal using advanced braid clock signaling for a conventional encoding time.

According to an example embodiment, a differential signal processing device includes an encoder configured to encode input data into one or more differential signals and a transmitter configured to sequentially transmit the one or more differential signals using a plurality of transmission lines. The encoder converts a plurality of bits, corresponding to a transmission time interval, among the input data, into an encoding code array in the transmission time interval obtained by increasing an encoding unit time, encoded for each of the one or more differential signals, by an integer multiple.

The encoder may convert the encoding code array into the one or more differential signals according to advanced braid clock signaling, and the advanced braid clock signaling may include a single braid code, a single mapping code, and a single index code, corresponding to a single differential signal. The encoder may adjust the integer multiple based on the plurality of bits, corresponding to the transmission time interval, among the input data. The encoder may determine the number of the plurality of bits, corresponding to the transmission time interval according to the integer multiple, based on the number of bit per encoding unit time encoded according to the number of the plurality of transmission lines and the number of cases of a differential signal for the number of bits.

The encoder may determine the number of cases of a differential signal based on the number of the plurality of transmission lines, and the number of cases of a differential signal may be a sum of the number of cases of a first differential signal preset according to the braid clock signal and the number of cases of a second differential signal according to the number of a pair of transmission lines. The encoder may include a first processing unit configured to convert the input data into the encoding code array and a second processing unit configured to correct the encoding code array according to whether a state transition occurs for the encoding code array.

The first processing unit may split the plurality of bits, corresponding to the transmission time interval, among the input data into first split data and second split data, and the first processing unit may extract a mapping code from a preset code map to set the second split data as an index code based on the first split data. The encoding code array may be generated, based on the mapping code and the index code, according to the advanced braid clock signaling.

The second processing unit may convert the mapping code and the index code with reference to a preset state transition table, according to whether a state transition occurs for the encoding code array. The second processing unit may convert the encoding code array into a state transition code based on the second mapping code and the second index code and may determine the state transition code as the encoding code array.

The differential signal processing device may further include a receiver configured to sequentially receive one or more differential signals from the transmitter through the plurality of transmission lines and a decoder configured to perform an inverse operation of the encoder to decode the one or more differential signals to the input data.

According to an example embodiment, a method of operating a differential signal processing device includes converting a plurality of bits, corresponding to a transmission time interval, among input data into an encoding code array by an encoder, transmitting one or more differential signals, corresponding to the encoding code array, to a transmitter by the encoder, and sequentially transmitting the one or more differential signals through a plurality of transmission lines by the transmitter. The transmission time interval is a time obtained by increasing an encoding unit time, for which each of the one or more differential signals is encoded, by an integer multiple.

The converting a plurality of bits may include splitting the plurality of bits, corresponding to the transmission time interval, among the input data into first split data and second split data by the encoder, extracting a mapping code, corresponding to the first split data, from a preset code map, setting the second split data as an index code, and generating the encoding code array based on the mapping code and the index code.

The converting a plurality of bits may further include detecting whether a state transition occurs for the encoding code array, converting the mapping code and the index code according to whether the state transition occurs, extracting a state transition code from a state transition table based on the converted mapping code and the converted index code, and correcting the encoding code array to the state transition code.

According to an example embodiment, a method of electronic signaling includes receiving input data; identifying a first transmission time interval corresponding to an encoding unit time multiplied by an integer multiple; selecting a plurality of bits from the input data based on the first transmission time interval; encoding the plurality of bits into an encoding code array comprising a number of encoding codes corresponding to the integer multiple; identifying a sequence of differential signals, wherein each differential signal in the sequence of differential signals corresponds to an encoding code of the encoding code array; and transmitting each of the sequence of differential signals using a plurality of transmission lines.

BRIEF DESCRIPTION OF DRAWINGS

The above and other aspects, features, and advantages of the present disclosure will be more clearly understood from the following detailed description, taken in conjunction with the accompanying drawings.

FIG. 10 illustrates an example of a state transition table;

FIG. 12 illustrates an example embodiment of a bit efficiency table preset to an adjustment unit in FIG. 11;

DETAILED DESCRIPTION

Figure 1:
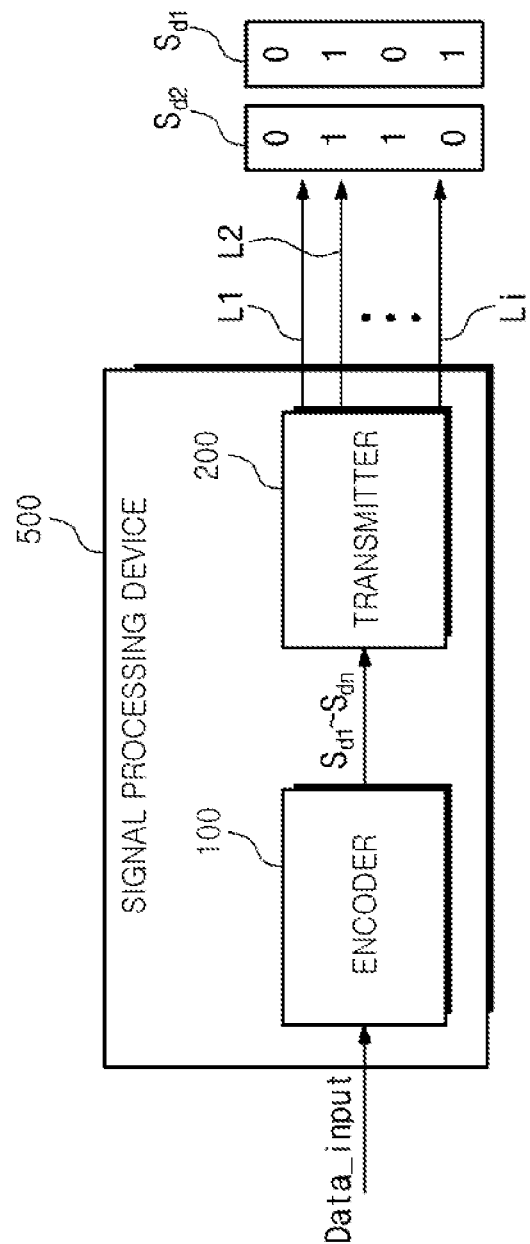
FIG. 1 is a block diagram of a differential signal processing device according to an example embodiment.

The present application provides a differential signal processing device capable of transmitting state transition information corresponding to a clock signal without a dummy bit.

Differential signaling refers to a method for electrically transmitting information using complementary signals. The same signal may be sent as a pair of signals in different conductors (e.g., wires or traces on a circuit board). The receiving circuit reads the electrical difference between the two signals (i.e., as opposed to the difference between a signal wire and ground).

Differential transmission may cause a reduction in electromagnetic interference (EMI) and an increased noise margin, which may provide a significant reduction in simultaneous switching noise. However, in some cases differential signaling requires more signal lines than the number of signals.

The present disclosure may be variably modified and may have various embodiments, particular examples of which will be illustrated in drawings and described in detail. However, it should be understood that the following exemplifying description of the present disclosure is not intended to restrict the present disclosure to specific forms of the present disclosure but rather the present disclosure is meant to cover all modifications, similarities, and alternatives which are included in the spirit and scope of the present disclosure.

While terms such as "first" and "second," etc., may be used to describe various components, such components must not be understood as being limited to the above terms. The above terms are used only to distinguish one component from another. For example, a first component may be referred to as a second component without departing from the scope of rights of the present disclosure, and likewise, a second component may be referred to as a first component. The term "and/or" encompasses both combinations of the plurality of related items disclosed and any item from among the plurality of related items disclosed.

When a component is mentioned as being "connected" to or "accessing" another component, this may mean that the component is directly connected to or accessing the other component, but it is to be understood that another component may exist therebetween. On the other hand, when a component is mentioned as being "directly connected" to or "directly accessing" another component, it is to be understood that there are no other components in-between.

The terms used in the present application are merely used to describe particular embodiments and are not intended to limit the present disclosure. An expression used in the singular encompasses the expression of the plural unless the expression has a clearly different meaning in the context. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as using meanings equal to the contextual meanings in the relevant field of art and are not to be interpreted as using ideal or excessively formal meanings unless clearly defined as using such in the present application.

Hereinafter, example embodiments will be described below in detail with reference to the accompanying drawings, where those components are rendered using the same reference number that are the same or are in correspondence, regardless of the figure number, and redundant explanations are omitted.

Figure 2:
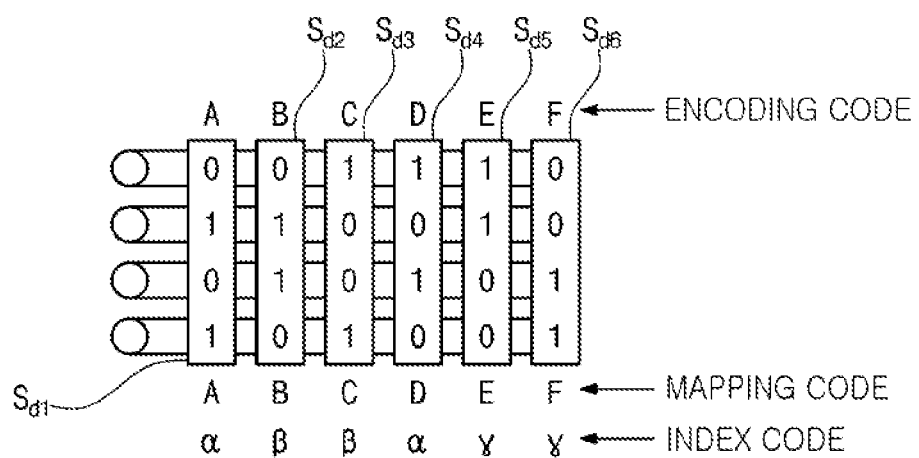
FIG. 2 illustrates an example embodiment of advanced braid clock signaling.
Figure 3:
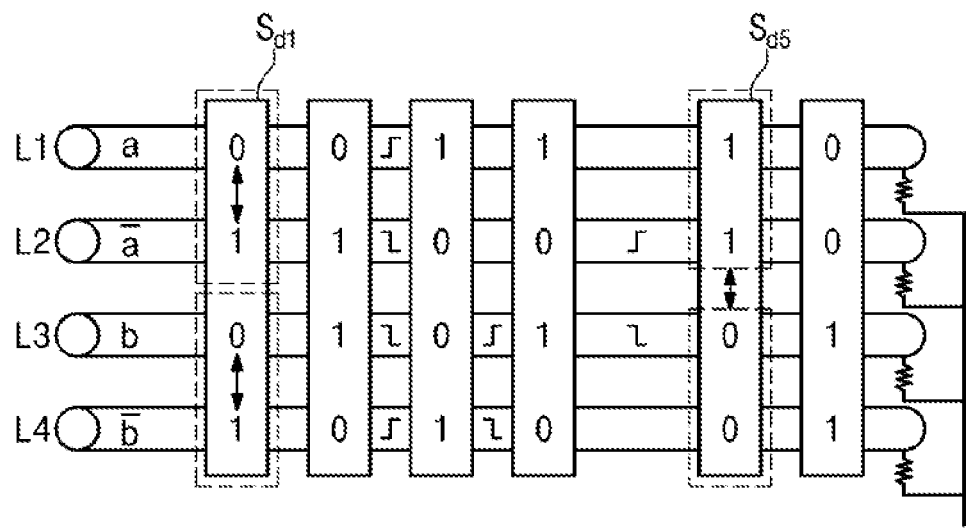
FIG. 3 illustrates an example embodiment of a differential signal in FIG. 1.
Figure 4:
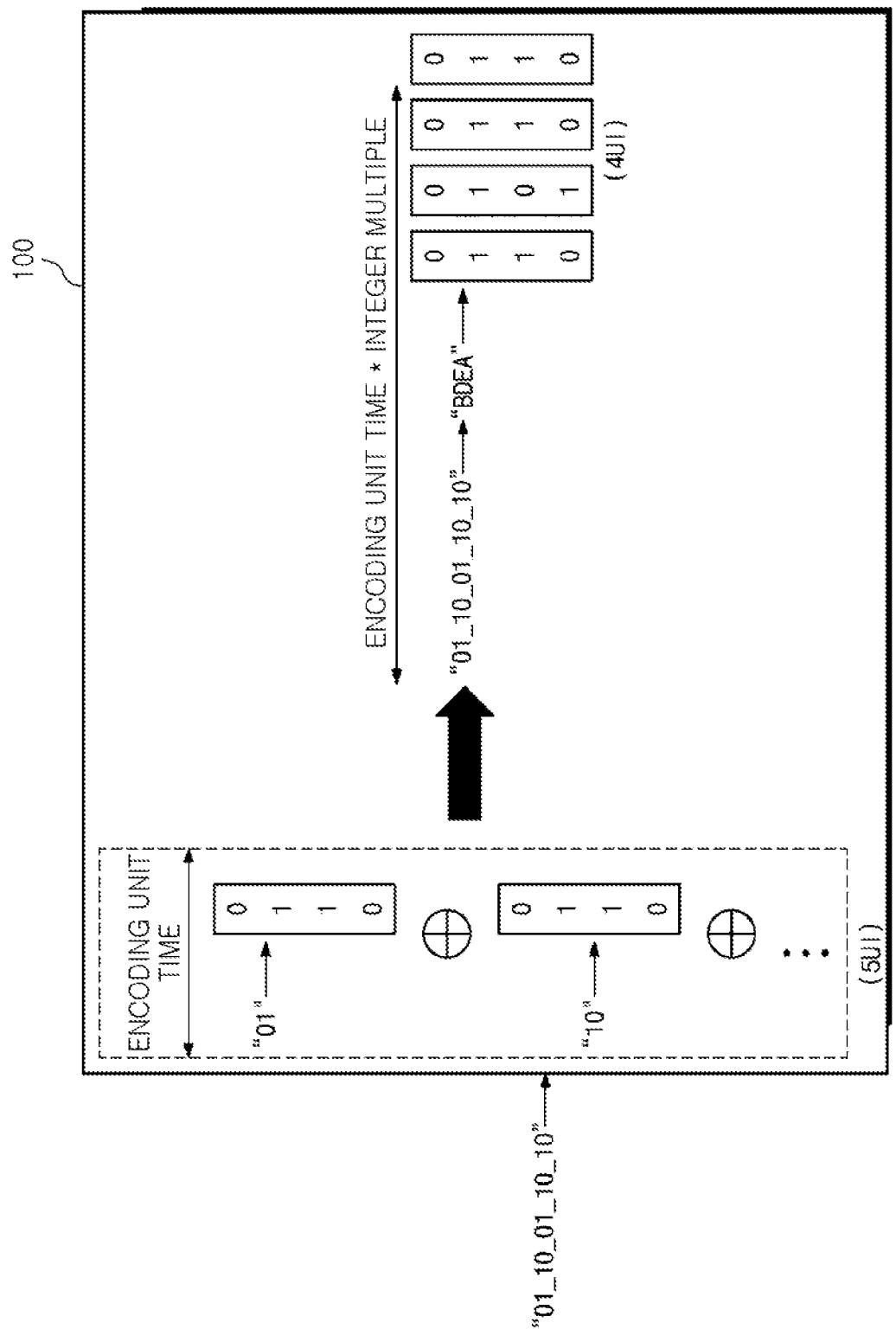
FIG. 4 illustrates an example embodiment of a transmission time interval of an encoder in FIG. 1.

FIG. 1 is a block diagram of a differential signal processing device according to an example embodiment. FIG. 2 illustrates an example embodiment of advanced braid clock signaling. FIG. 3 illustrates an example embodiment of a differential signal in FIG. 1. FIG. 4 illustrates an example embodiment of a transmission time interval of an encoder in FIG. 1.

Braid clock signaling may refer to a method of embedding clock information into a data stream without data overhead, unnecessary pins, and clock channels. To reduce the data overhead, the clock information may be embedded in every other data period.

Referring to FIGS. 1 through 4, a differential signal processing device 500 may include an encoder 100 and a transmitter 200.

The encoder 100 may encode input data $D_{IN}$ to one or more differential signals $S_{d1}$ to $S_{dN}$, based on advanced braid clock signaling. Advanced braid clock signaling may refer to a protocol for encoding or decoding data transmitted or received in a differential transmission manner.

As illustrated in FIG. 2, in advanced braid clock signaling, differential signals encoded according to the number of a plurality of transmission lines, may correspond to respective encoding codes. For example, $S_{d1}$ to $S_{d6}$ may be differential signals, L1 to L4 may be transmission lines, and range of letters A to F may be encoding codes.

In one example, a first differential signal [0, 1, 0, 1] may correspond to an "A" encoding code among encoding codes, and a second differential signal [0, 1, 1, 0] may correspond to a "B" encoding code among the encoding codes.

In advanced braid clock signaling, each of the encoding codes may correspond to a pair including a mapping code and an index code. The variables α, β, and γ may represent mapping codes, while the numbers 0 and 1 may represent index codes.

For example, the "A" encoding code may correspond to a pair including the "α" mapping code and the "0" index code. Similarly, the "B" encoding code may correspond to a pair including the "β" mapping code and the "0" index code. Thus, the encoder 100 may encode the input data $D_{IN}$ to the one or more differential signals $S_{d1}$ to $S_{dN}$ using encoding codes, mapping codes and index codes of the advanced braid clock signaling.

The transmitter 200 may sequentially transmit the one or more differential signals $S_{d1}$ to $S_{dN}$ through a plurality of transmission lines L1 to LN. For example, the transmitter 200 may sequentially transmit the one or more differential signals $S_{d1}$ to $S_{dN}$ through the plurality of transmission lines L1 to LN using at least one of an impedance matching circuit, a serial converter, and an electrostatic remover.

For ease of description, it will be assumed that the plurality of transmission lines L1 to LN include four transmission lines. However, the number of the transmission lines is not limited thereto, and the present disclosure may be applied to any different signal processing devices, each with an even number of transmission lines.

The one or more differential signals $S_{d1}$ to $S_{dN}$ may include complementary bit information in a pair of transmission lines. Transmission lines may be referred to as L1, L2, L3, L4, or the like. For example, as illustrated in FIG. 3, a first differential signal $S_{d1}$ may include complementary bit information such as [0, 1] with different level states in a first pair of transmission lines. Similarly, the first differential signal $S_{d1}$ may also include complementary bit information such as [0, 1] with different level states in a second pair of transmission lines. For example, the one or more differential signals $S_{d1}$ to $S_{dN}$ may include any one of complementary bit information among [0, 1, 0, 1], [0, 1, 1, 0], [1, 0, 0, 1], and [1, 0, 1, 0] along a pair of transmission lines, respectively.

The one or more differential signals $S_{d1}$ to $S_{dN}$, according to an example embodiment, may include complementary bit group information in units of a pair of transmission lines. For example, as illustrated in FIG. 3, a fifth differential signal $S_{d5}$ may include bit group information of [1, 1] in the second pair of transmission lines L3 and L4 and bit group information of [0, 0] in the first pair of transmission lines L1 and L2. In this case, the bit group information of [1, 1] in the first pair of transmission lines L1 and L2 may be complementary to the bit group information of [0, 0] in the second pair of transmission lines L3 and L4.

The one or more differential signals $S_{d1}$ to $S_{dN}$ may include data in which a state transition for another adjacent differential signal is detected. For example, as illustrated in FIG. 3, the third differential signal $S_{d3}$ may include data in which a state transition for the adjacent second differential signal $S_{d2}$ and the adjacent fourth differential signal $S_{d4}$ is detected.

In an example embodiment according to the present inventive concept, the encoder 100 may convert a plurality of bits, among the input data $D_{IN}$, into an encoding code array. The plurality of bits may correspond to a transmission time interval TTI. The transmission time interval TTI may be a time obtained by increasing the encoding unit time UI, encoded for each of the one or more differential signals $S_{d1}$ to $S_{dN}$, by an integer multiple M. In this case, the integer multiple M may be a value smaller than the total number of times for the encoding unit time UI encoded according to braid clock signaling.

For example, the encoder 100 may convert a plurality of bits among the input data $D_{IN}$, into an encoding code array in the transmission time interval TTI. The plurality of bits may correspond to a transmission time interval TTI. The transmission time interval TTI may be obtained by increasing the encoding unit time UI encoded for each of the one or more differential signals $S_{d1}$ to $S_{dN}$, by an integer multiple M.

For example, as illustrated in FIG. 4, when the number of transmission lines L1 to LN is four, and the input data $D_{IN}$ is 10 bits, the encoder 100 may convert 10 bits, corresponding to a transmission time interval TTI, among the input data into a code array (for example, BDEA) in a transmission time interval TTI corresponding to four encoding unit times UI. Meanwhile, a differential signal processor may encode 10 bits of input data $D_{IN}$ for five encoding unit times UI. In some examples of the differential signal processing device, the number of bits encoded for each encoding unit time may be 2 bits.

The encoding code array may include one or more encoding codes. For example, the encoding code may be A, B, C, etc. Additionally, or alternatively, the encoding code array may include a sequence of four encoding codes, such as AADA, BDEA, etc. The encoding code sequence may correspond to the one or more differential signals $S_{d1}$ to $S_{dN}$. Each of the at least one encoding codes may correspond to the one or more differential signals $S_{d1}$ to $S_{dN}$ in one-to-one correspondence. For example, as illustrated in FIG. 4, the encoding code B may correspond to the first differential signal $S_{d1}$, and the encoding code D may correspond to the second differential signal $S_{d2}$.

Accordingly, the encoder 100 may sequentially transmit the one or more differential signals $S_{d1}$ to $S_{dN}$ corresponding to the encoding code array through the transmitter 200 according to the advance braid clock signaling.

For example, since the differential signal processing device 500 may convert more input bits through the encoder 100 in the transmission time interval TTI, as compared with a differential signal processing device according to the related art, transmission time of the input data $D_{IN}$ may be reduced. Furthermore, the differential signal processing device 500 may transmit more input data in a differential manner during each time period to reduce power consumption.

Thus, according to an example embodiment a method of electronic signaling may include receiving input data $D_{IN}$; identifying a first transmission time interval TTI corresponding to an encoding unit time UI, multiplied by an integer multiple M (e.g., 4, as illustrated in FIG. 4); selecting a plurality of bits (e.g., 10 bits) from the input data based on the first transmission time interval TTI; encoding the plurality of bits into an encoding code array (e.g., BDEA) comprising a number of encoding codes corresponding to the integer multiple; identifying a sequence of differential signals, wherein each differential signal in the sequence of differential signals corresponds to an encoding code of the encoding code array; and transmitting each of the sequence of differential signals using a plurality of transmission lines.

Figure 5:
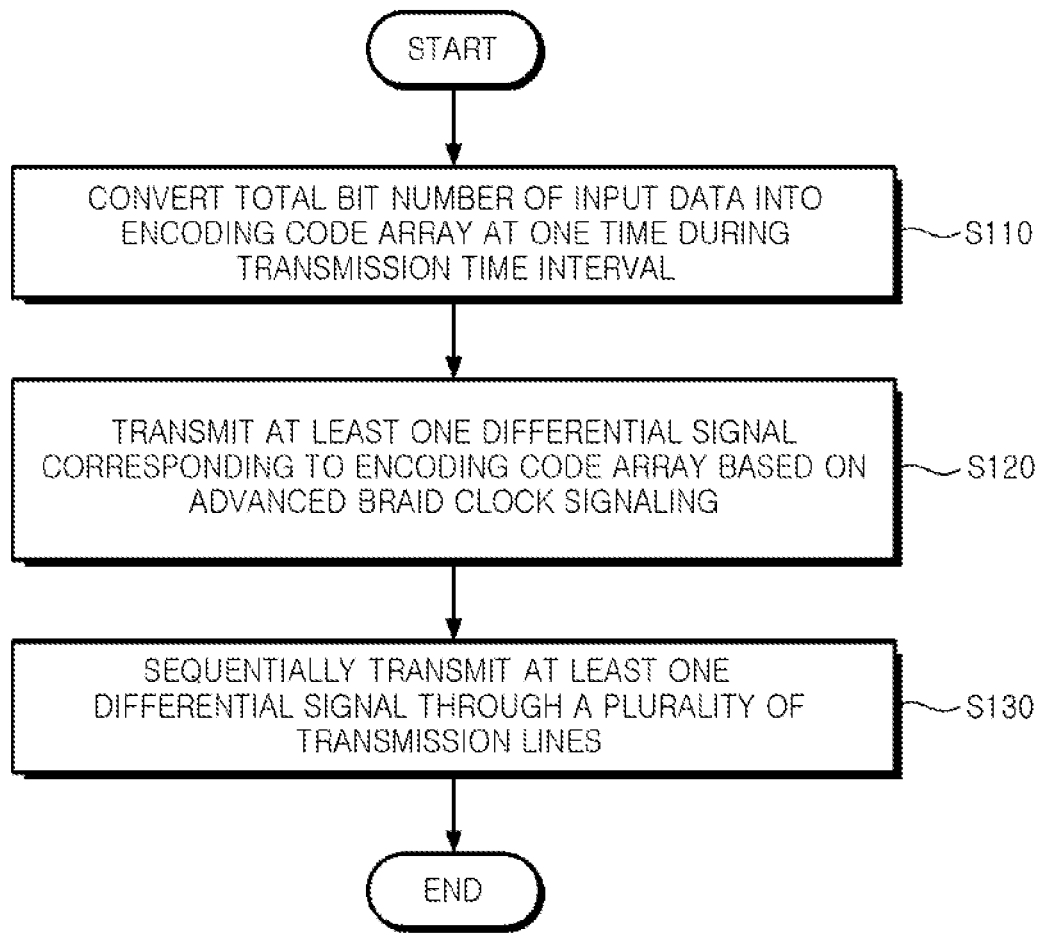
FIG. 5 illustrates an operation process of the differential signal processing device in FIG. 1.

FIG. 5 illustrates an operation process of the differential signal processing device 500 in FIG. 1. Referring to FIGS. 1 through 5, in operation S110, the encoder 100 may convert a plurality of bits, corresponding to a transmission time interval, among input data $D_N$ into an encoding code array.

In operation S120, the encoder 100 may transmit one or more differential signals $S_{d1}$ to $S_{dN}$, corresponding to the encoding code array, to the transmitter 200 based on advanced braid clock signaling.

In operation S130, the transmitter 200 may sequentially transmit the one or more differential signals $S_{d1}$ to $S_{dN}$ through a plurality of transmission lines L1 to LN.

Hereinafter, the encoder 100 will be described in further detail with reference to FIG. 6.

Figure 6:
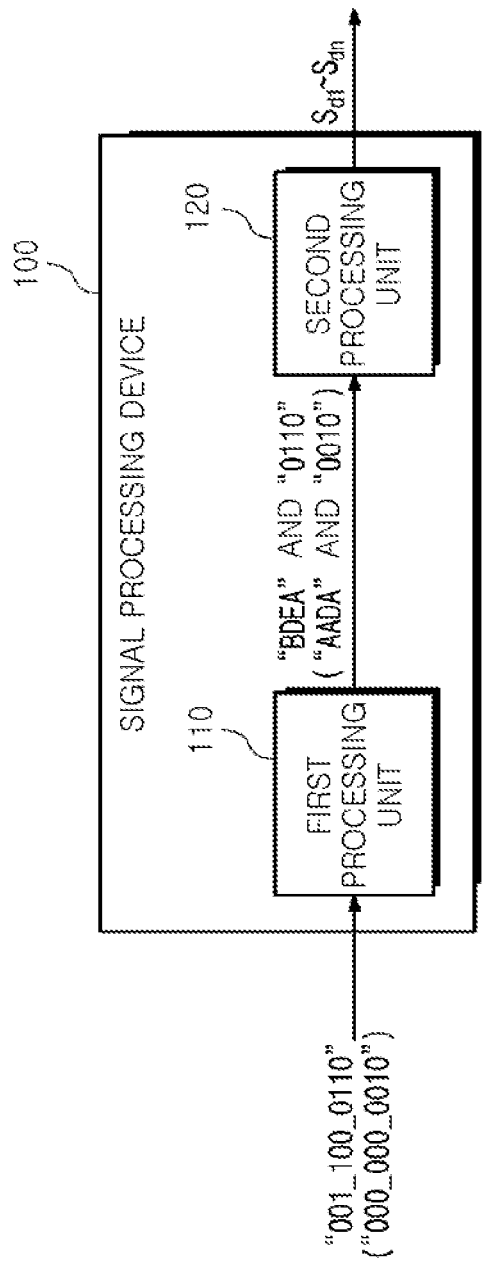
FIG. 6 is a block diagram of an encoder according to an example embodiment.
Figure 7:
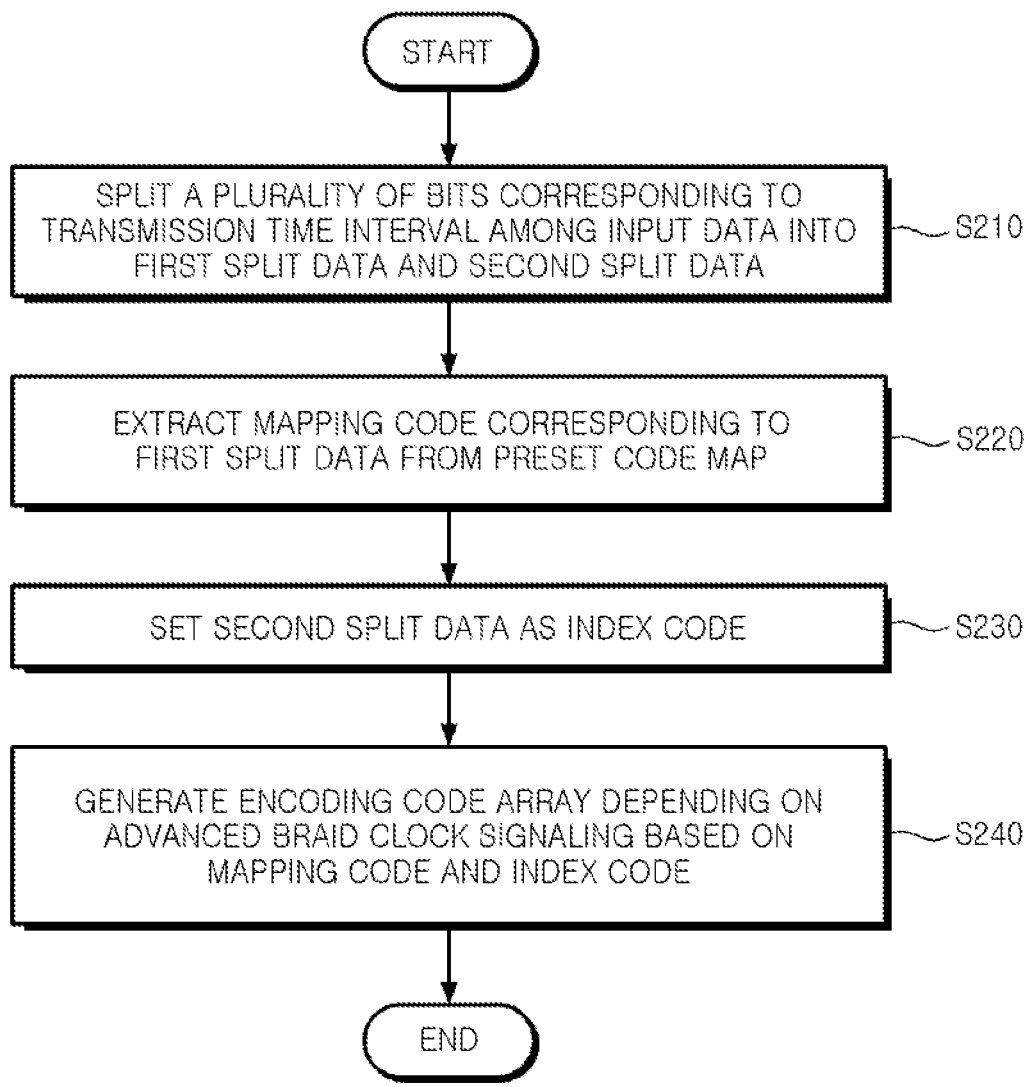
FIG. 7 illustrates an operation process of a first processing unit in FIG. 6.
Figure 8:
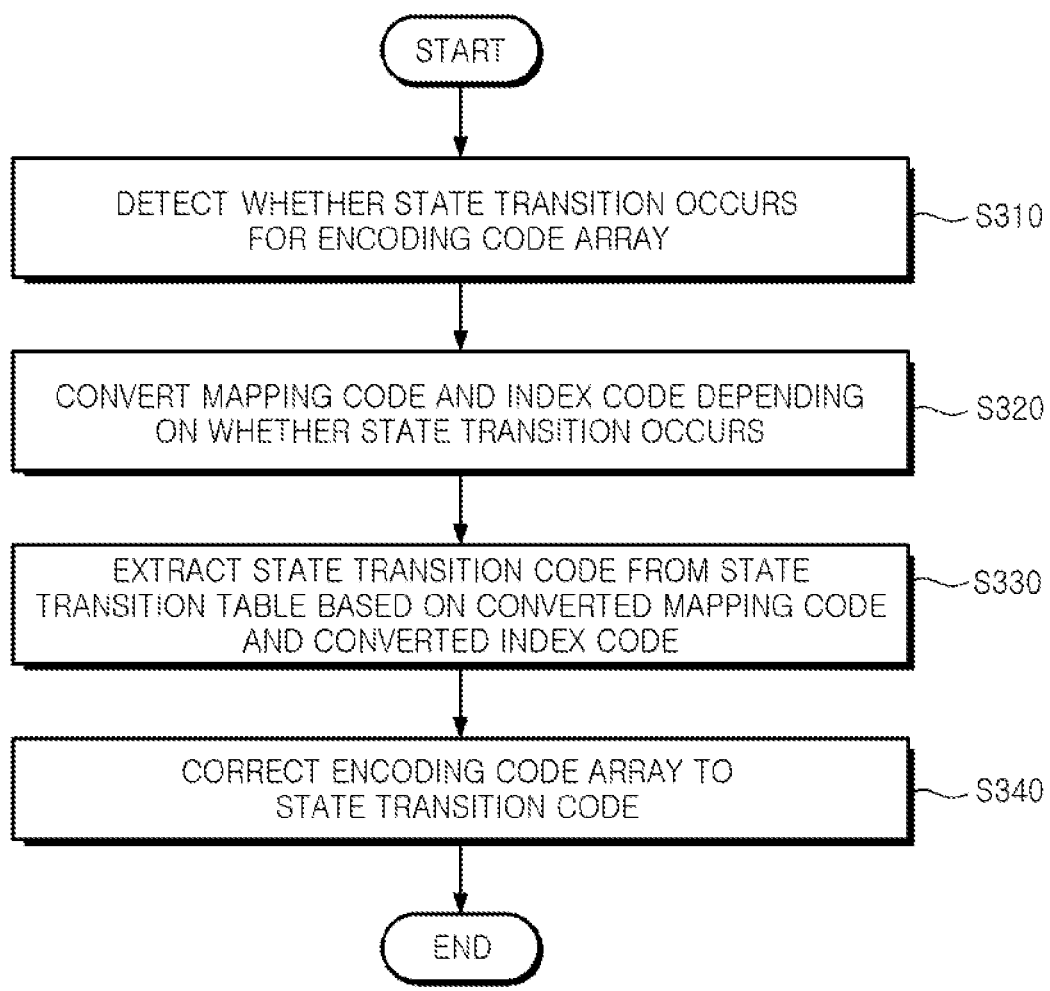
FIG. 8 illustrates an operation process of a second processing unit in FIG. 6.
Figure 9:
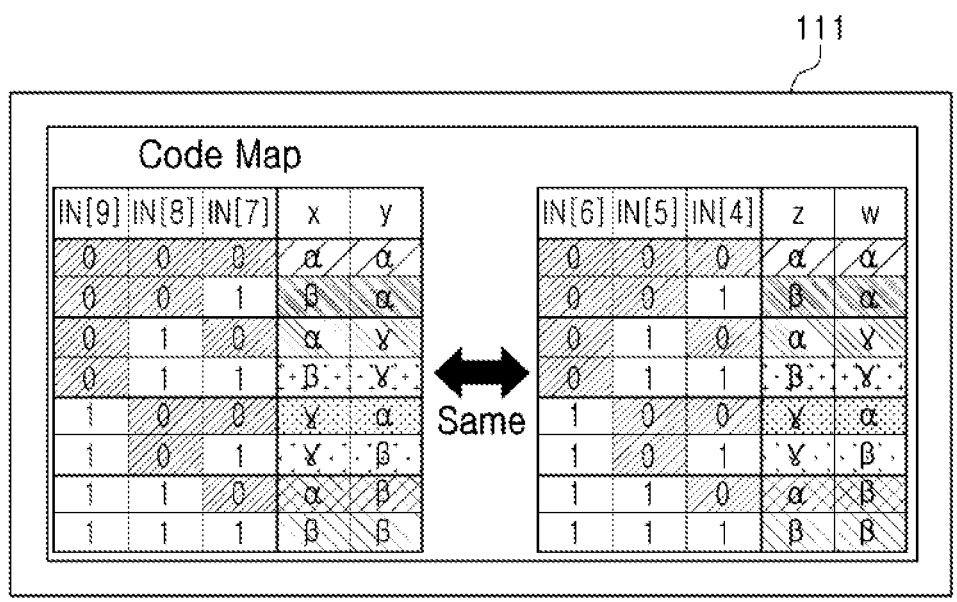
FIG. 9 illustrates an example of a preset code map.
Figure 10:
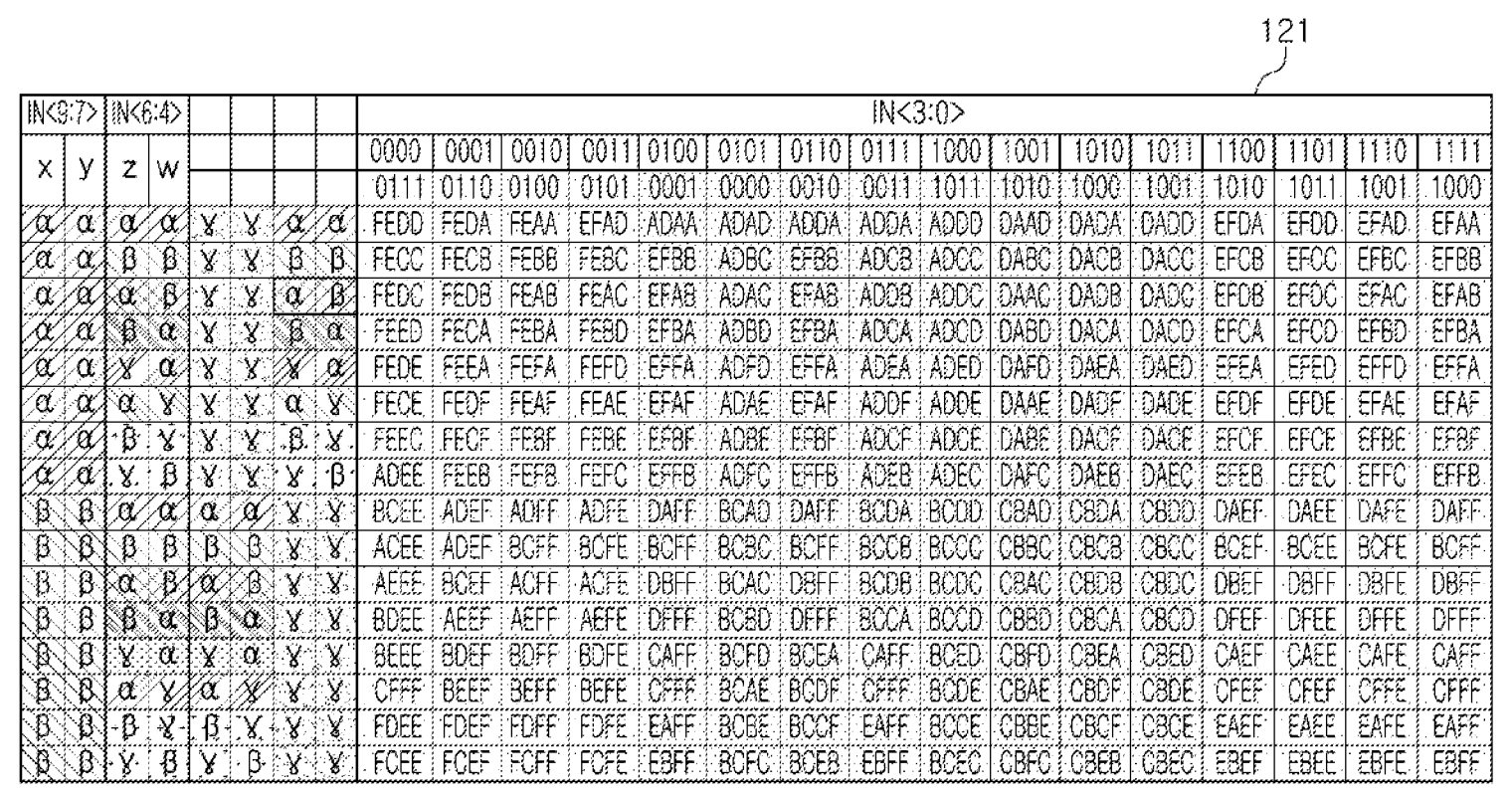

FIG. 6 is a block diagram of an encoder 100 according to an example embodiment. FIG. 7 illustrates an operation process of a first processing unit 110 in FIG. 6. FIG. 8 illustrates a second processing unit 120 in FIG. 6. FIG. 9 is an example of a preset code map 111. FIG. 10 is an example of the state transition table 121.

Referring to FIGS. 6 through 10, the encoder 100 may include the first processing unit 110 and the second processing unit 120.

The first processing unit 110 may convert input data $D_{IN}$ into an encoding code array based on advanced braid clock signaling.

For example, the first processing unit 110 may convert 10 bits of input data $D_{IN}$ into four bits of braid code array (for example, ABCD, DACE, etc, or the like) according to advanced braid clock signaling. In another example, the first processing unit 110 may convert 10 bits of input data $D_{IN}$ [001_100_0110] into an encoding code array "BDEA" according to advanced braided clock signaling.

In operation S210, the first processing unit 110 may split a plurality of bits, corresponding to a transmission time interval TTI, among the input data $D_{IN}$ into first split data and second split data.

For example, when the plurality of bits corresponding to the transmission time interval TTI among the input data DIN is "0011000110," the first processing unit 110 may split "0011000110" into first split data "001100," corresponding to a first portion of the input data DIN, "<u>001100</u>0110," and second split data "0110" corresponding to a second portion of the input data DIN, "001100<u>0110</u>."

In operation S220, the first processing unit 110 may extract a mapping code, corresponding to the first split data, from the preset code map 111. The first split data is data to be converted into a mapping code. Additionally, the mapping code may be smaller than the first split data.

As illustrated in FIG. 9, "001" corresponding to the first split data "<u>001</u>100" may be extracted as two bits of mapping code "βα," and "100" corresponding to the first split data "001<u>100</u>" may be extracted as two bits of mapping code "γα." The first split data "001100" may be two bits smaller than a mapping code "βαγα."

In operation S230, the first processing unit 110 may set the second split data as an index code. The second split data may be an index code used for identifying the mapping code extracted from the first split data.

For example, the second split data "0110" may be an index code used for the mapping code "βαγα" extracted from the first split data "001100," and "<u>0</u>110" may be an index code used for "<u>β</u>αγα," "0<u>1</u>10" may be an index code used for "β<u>α</u>γα," "01<u>1</u>0" may be an index code used for "βα<u>γ</u>α," and "011<u>0</u>" may be an index code used for "βαγ<u>α</u>."

In operation S240, the first processing unit 110 may generate an encoding code array according to advanced braid clock signaling illustrated in FIG. 2. The encoding code array may be based on the mapping code and the index code.

The second processing unit 120 may correct the encoding code array according to whether a state transition occurs for the encoding code array.

In operation S310, the second processing unit 120 may detect whether a state transition occurs for the encoding code array generated through the first processing unit 110.

For example, when the encoding code array, generated through the first processing unit 110, is "AADA," the second processing unit 120 may detect that a state transition does not occur in "<u>A</u>ADA." When the encoding code array, generated through the first processing unit 110, is "BDEA," the second processing unit 120 may detect that a state transition occurs in "B<u>D</u>EA," BD<u>E</u>A," and BDE<u>A</u>."

In this case, in operation S320, the second processing unit 120 may convert the mapping code and the index code. The mapping code may be generated through the first processing unit 110. The index code may be set by the first processing unit 110, according to whether a state transition occurs.

When a state transition does not occur for the encoding code array, the second processing unit 120 may convert the mapping code, generated through the first processing unit 110, with reference to the state transition table 121. For example, when a state transition does not occur for an encoding code array "<u>A</u>ADA," the second processing unit 120 may convert a mapping code "αααα," generated through the first processing unit 110, into "γγαα" with reference to the state transition table 121.

When a state transition does not occur for the encoding code array, the second processing unit 120 may convert an index code. The index code may be set through the first processing unit 110, with reference to the state transition table 121. For example, when a state transition does not occur for the encoding code array "<u>A</u>ADA," the second processing unit 120 may convert the index code "0010," set through the first processing unit 110, into "0100" with reference to the state transition table 121.

In operation S330, the second processing unit 120 may extract a state transition code 122 from the state transition table 121, based on the mapping code converted in operation S320 and the index code converted in operation S320. The state transition code 122 may be a code array converted from the encoding code array to secure transmission for a clock signal.

In operation S340, the second processing unit 120 may correct the encoding code array, generated through the first processing unit 110, to the state transition code 122.

Figure 11:
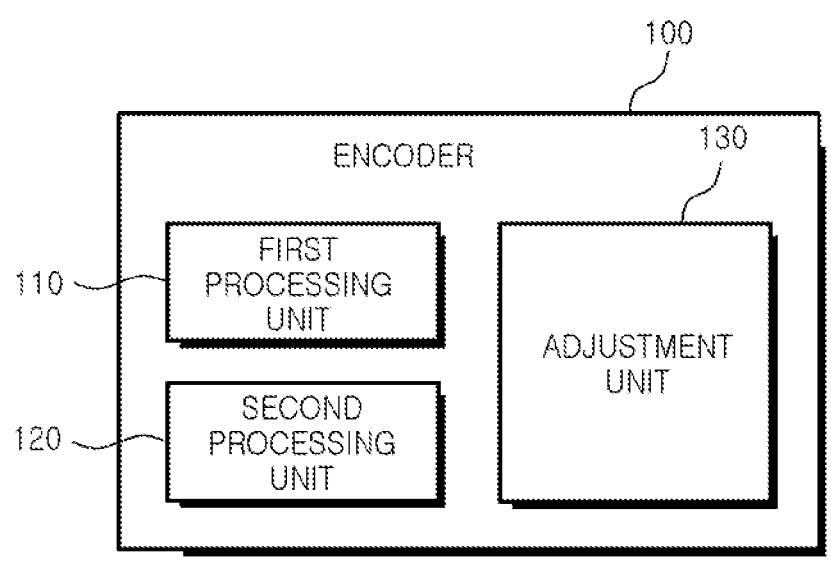
FIG. 11 is a block diagram of the encoder in FIG. 1 according to another example embodiment.
Figure 13:
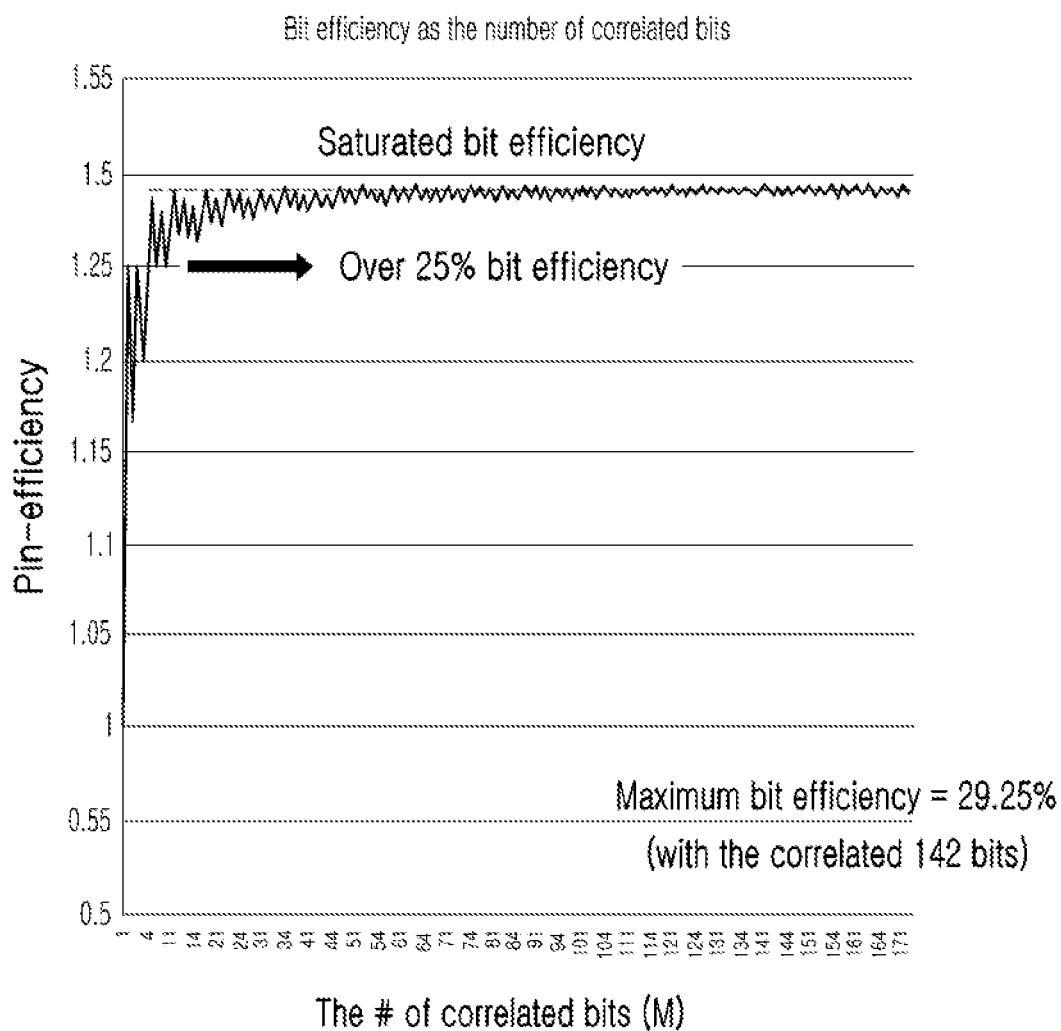
FIG. 13 is a graph illustrating bit efficiency according to an integer multiple.

FIG. 11 is a block diagram of the encoder 100 in FIG. 1 according to an example embodiment. FIG. 12 illustrates an example embodiment of a bit efficiency table preset to an adjustment unit 130 in FIG. 11. FIG. 13 is a graph illustrating bit efficiency according to an integer multiple.

Referring to FIGS. 11 through 13, an encoder 100 may include a first processing unit 110 and a second processing unit 120 and an adjustment unit 130. Hereinafter, duplicate descriptions of the first and second processing units 110 and 120, denoted by the same reference numerals described with reference to FIGS. 6 through 10, will be omitted.

The adjustment unit 130 may adjust an integer multiple M based on the number of a plurality of bits, corresponding to a transmission time interval TTI, among input data $D_N$. The adjustment unit 130 may determine an integer multiple M, corresponding to the number of the plurality of bits, from a bit efficiency table 131.

As illustrated in FIG. 12, the bit efficiency table 131 may be stored after being calculated in advance, according to Conditional Expressions 1, 2, and 3, through the adjustment unit 130.

The adjustment unit 130 may determine the number of a plurality of bits, corresponding to the transmission time interval TTI, among the input data $D_{IN}$ in the transmission time interval TTI through Conditional Expression 1. Conditional Expression 1 may be expressed as:

$$N=[M \times k] \quad (1)$$

where M may represent an integer multiple, and K may represent a constant calculated through Conditional Expression 2.

Conditional Expression 2 is a calculation for calculating the constant K. Conditional Expression 2 may be expressed as:

$$K=\log_x y \quad (2)$$

In this case, X may represent the number of bits per encoding unit time UI encoded according to the number of a plurality of transmission lines (for example, L1 to L4), and Y may represent the number of cases of a differential signal for the number of bits X. For example, when the number of the plurality of transmission lines (for example, L1 to LN) is four, the number of bits X, encoded for the encoding unit time UI, may be two. When the number of differential signals for the plurality of transmission lines (for example, L1 to LN) is six, the number of bits X, encoded for the encoding unit time UI, may be three.

The adjustment unit 130 may determine the number of cases of a differential signal for the number of bits per encoding unit time, encoded for the encoding unit time UI, based on the number of transmission lines (for example, L1 to LN). The number of cases of a differential signal for the number of bits per encoding unit time, encoded for the encoding unit time UI may be the sum of the number of cases of a differential signal preset according to braid clock signaling and the number of cases of a second differential signal according to the number of a pair of transmission lines.

For example, the number of cases Y of a differential signal for two bits, encoded for the encoding unit time UI, may be six. In this example embodiment, six is determined from the sum of four and two. Four is the number of first differential signals [0, 1, 0, 1], [0, 1, 1, 0], [1, 0, 0, 1], and [1, 0, 1, 0]. Two is the number of cases of a second differential signal according to the number of a pair of transmission lines (2!). In addition, the number of cases Y of a differential signal for three bits, encoded for the encoding unit time UI, may be 18. In this example embodiment, 18 is determined from the sum of eight and twelve. Eight is the number of differential signals preset according to braid clock signaling. Twelve is the number of cases of a differential signal according to the number of a pair of transmission lines (3!2!).

Accordingly, when the number of the plurality of transmission lines (for example, L1 to LN) is four, K may be about 2.585 and the number of bits N, corresponding to the transmission time interval TTI, among the input data $D_{IN}$ may be increased by about 2.585 times according to the integer multiple M. When the number of the plurality of transmission lines (for example, L1 to LN) is six, K may be about 2.631 and the number of bits N, corresponding to the transmission time interval TTI, among the input data $D_{IN}$ may be increased by about 2.635 times according to the integer multiple M.

The adjustment unit 130 may store bit efficiency, calculated through Conditional Expression 3, in the bit efficiency table 131 in advance. Conditional Expression 3 may be expressed as:

$$\text{BIT EFFICIENCY}=N/(2 \times M) \quad (3)$$

As illustrated in FIG. 13, a magnitude of the bit efficiency may be increased by an integer multiple M to converge on an efficiency of 25% to 29%.

Figure 14:
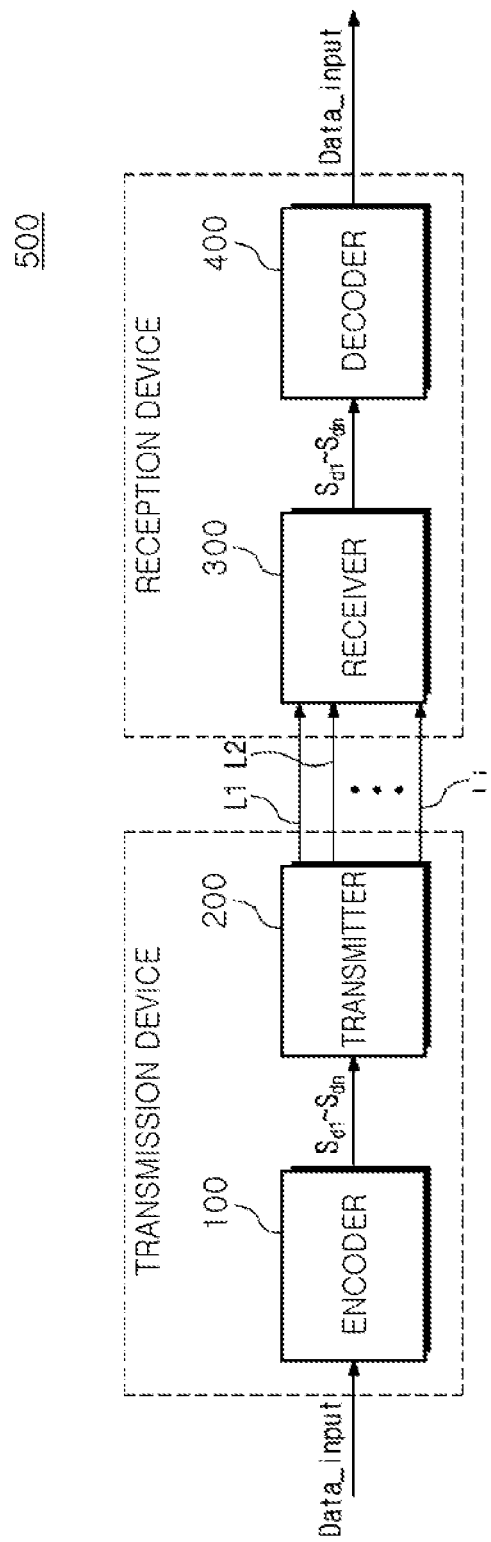
FIG. 14 illustrates an example embodiment of a differential signal processing device.

FIG. 14 illustrates an example embodiment of a differential signal processing device 500_1.

Referring to FIG. 14, the differential signal processing device 500_1 may include an encoder 100, a transmitter 200, a receiver 300, and a decoder 400. Hereinafter, duplicate descriptions of the encoder 100 and the transmitter 200, denoted by the same reference numerals described with reference to FIGS. 1 through 11, will be omitted. In this case, the encoder 100 and the transmitter 200 may be referred to as a transmission device, and the receiver 300 and the decoder 400 may be referred to as a reception device.

The receiver 300 may sequentially receive one or more differential signals $S_{d1}$ to $S_{dN}$ from the transmitter 200 through a plurality of transmission lines L1 to LN. For example, the receiver 300 may sequentially receive the one or more differential signals $S_{d1}$ to $S_{dN}$ through the plurality of transmission lines L1 to LN using at least one of an impedance matching circuit, a serial converter, and an electrostatic remover. The decoder 400 may decode the one or more differential signals $S_{d1}$ to $S_{dN}$ to input data $D_N$. The decoder 400 may perform an inverse operation of the encoder 100 on an encoding code array to decode the input data $D_N$ after converting the one or more differential signals $S_{d1}$ to $S_{dN}$, received for a transmission time interval TTI, into the encoding code array.

As described above, according to example embodiments, more input data may be converted into a differential signal using advanced braid clock signaling for conventional encoding time. Thus, transmission time for the input data may be reduced.

While example embodiments have been shown and described above, it will be apparent to those skilled in the art that modifications and variations could be made without departing from the scope of the present inventive concept as defined by the appended claims.

What is claimed is:

1. A differential signal processing device comprising:
   an encoder configured to encode input data into one or more differential signals; and
   a transmitter configured to sequentially transmit the one or more differential signals using a plurality of transmission lines,
   wherein the encoder converts a plurality of bits, corresponding to a transmission time interval, among the input data into an encoding code array in the transmission time interval obtained by increasing an encoding unit time, encoded for each of the one or more differential signals, by an integer multiple.

2. The differential signal processing device of claim 1, wherein the encoder converts the encoding code array into the one or more differential signals according to advanced braid clock signaling, and
the advanced braid clock signaling comprises a single braid code, a single mapping code, and a single index code, corresponding to a single differential signal.

3. The differential signal processing device of claim 1, wherein the encoder adjusts the integer multiple based on the plurality of bits, corresponding to the transmission time interval, among the input data.

4. The differential signal processing device of claim 2, wherein the encoder determines a number of the plurality of bits, corresponding to the transmission time interval according to the integer multiple, based on a number of bits per encoding unit time encoded according to a number of the plurality of transmission lines and a number of cases of a differential signal for the number of bits per encoding unit time.

5. The differential signal processing device of claim 4, wherein the encoder determines the number of cases of a differential signal based on the number of the plurality of transmission lines, and
the number of cases of a differential signal is a sum of the number of cases of a first differential signal preset according to the braid clock signaling and the number of cases of a second differential signal according to the number of a pair of transmission lines.

6. The differential signal processing device of claim 4, wherein the encoder is configured to convert the input data into the encoding code array and to correct the encoding code array according to whether a state transition occurs for the encoding code array.

7. The differential signal processing device of claim 6, wherein the encoder splits the plurality of bits, corresponding to the transmission time interval, among the input data into first split data and second split data, and
wherein the encoder extracts a mapping code from a preset code map to set the second split data as an index code based on the first split data.

8. The differential signal processing device of claim 7, wherein the encoding code array is generated, based on the mapping code and the index code, according to the advanced braid clock signaling.

9. The differential signal processing device of claim 8, wherein the encoder converts the mapping code and the index code with reference to a preset state transition table, according to whether a state transition occurs for the encoding code array, and
the encoder converts the encoding code array into a state transition code based on a second mapping code and a second index code, and determines the state transition code as the encoding code array.

10. The differential signal processing device of claim 1, further comprising:
a receiver configured to sequentially receive the one or more differential signals from the transmitter through the plurality of transmission lines; and
a decoder configured to perform an inverse operation of the encoder to decode the one or more differential signals to the input data.

11. A method of operating a differential signal processing device, the method comprising:

converting a plurality of bits, corresponding to a transmission time interval, among input data into an encoding code array by an encoder;
transmitting one or more differential signals, corresponding to the encoding code array, to a transmitter by the encoder; and
sequentially transmitting the one or more differential signals through a plurality of transmission lines by the transmitter,
wherein the transmission time interval is a time obtained by increasing an encoding unit time, for which each of the one or more differential signals is encoded, by an integer multiple.

12. The method of claim 11, wherein the converting the plurality of bits comprises:
splitting the plurality of bits, corresponding to the transmission time interval, among the input data into first split data and second split data by the encoder;
extracting a mapping code, corresponding to the first split data, from a preset code map;
setting the second split data as an index code; and
generating the encoding code array based on the mapping code and the index code.

13. The method of claim 12, wherein the converting the plurality of bits further comprises:
detecting whether a state transition occurs for the encoding code array;
converting the mapping code and the index code according to whether the state transition occurs;
extracting a state transition code from a state transition table based on the converted mapping code and the converted index code; and
correcting the encoding code array to the state transition code.

14. A method of electronic signaling, the method comprising:
receiving input data;
identifying a first transmission time interval corresponding to an encoding unit time multiplied by an integer multiple;
selecting a plurality of bits from the input data based on the first transmission time interval;
encoding the plurality of bits into an encoding code array comprising a number of encoding codes corresponding to the integer multiple;
identifying a sequence of differential signals, wherein each differential signal in the sequence of differential signals corresponds to an encoding code of the encoding code array; and
transmitting each of the sequence of differential signals using a plurality of transmission lines.

15. The method of claim 14, wherein encoding the plurality of bits comprises:
splitting the plurality of bits into first split data and second split data;
extracting a mapping code for the first split data using a preset code map;
setting the second split data as an index code; and
generating the encoding code array based on the mapping code and the index code.

16. The method of claim 15, wherein converting the plurality of bits further comprises:
detecting whether a state transition occurs for the encoding code array;
converting the mapping code and the index code based on the state transition;

extracting a state transition code from a state transition table based on the converted mapping code and the converted index code; and correcting the encoding code array based on the state transition code.

* * * * *